(12) United States Patent
Yoshida

(10) Patent No.: US 8,167,010 B2
(45) Date of Patent: May 1, 2012

(54) FUEL FILLER PORT CLOSING APPARATUS

(75) Inventor: Hiromitsu Yoshida, Soja (JP)

(73) Assignee: Asteer Co., Ltd, Okayama-Ken (JP)

( * ) Notice: Subject to any disclaimer, the term of this patent is extended or adjusted under 35 U.S.C. 154(b) by 438 days.

(21) Appl. No.: 12/460,431

(22) Filed: Jul. 17, 2009

(65) Prior Publication Data

US 2010/0012224 A1  Jan. 21, 2010

(30) Foreign Application Priority Data

Jul. 18, 2008  (JP) ................................. 2008-187610

(51) Int. Cl.
*B65B 1/04* (2006.01)

(52) U.S. Cl. ......................... 141/350; 141/231; 220/86.2

(58) Field of Classification Search .................. 141/231, 141/311 R, 312, 348–350, 368; 220/86.2
See application file for complete search history.

(56) References Cited

U.S. PATENT DOCUMENTS

| | | | | |
|---|---|---|---|---|
| 5,327,946 A | * | 7/1994 | Perkins | 141/59 |
| 6,234,555 B1 | * | 5/2001 | Emmerich et al. | 296/97.22 |
| 6,302,170 B1 | * | 10/2001 | Ott | 141/312 |
| 7,644,740 B2 | * | 1/2010 | Benjey et al. | 141/350 |
| 2006/0169354 A1 | * | 8/2006 | Walkowski et al. | 141/301 |

FOREIGN PATENT DOCUMENTS

DE  20 2007 004 451 U1  9/2007

* cited by examiner

*Primary Examiner* — Gregory Huson
*Assistant Examiner* — Jason Niesz
(74) *Attorney, Agent, or Firm* — DLA Piper LLP (US)

(57) ABSTRACT

Problems to be solved:
To provide a fuel filler port closing apparatus that can be adapted to fuel filling nozzles of various shapes and that excels in operability.
Means to solve the problems:
Problems are solved through the fuel filler port closing apparatus adapting two-action fuel filling operation. The first action is to open a cover 5 closing an opening 44 of a fuel filler port by pushing a slider 53 with fuel filling nozzle 71, and the second action is to push and open a flapper 3 closing an opening 211 of a nozzle guide.

4 Claims, 14 Drawing Sheets

FUEL FILLER PORT CLOSING APPARATUS

BACKGROUND OF THE INVENTION

1. Field of the Invention

The present invention relates to a fuel filler port closing apparatus provided with a flapper for opening and closing an opening of a nozzle guide for guiding a fuel filling nozzle inserted from an opening of a filler neck (a fuel filler port), the flapper being pushed and biased upwardly by a torsion coil spring and being rotatable downwardly.

2. Description of the Related Art

A filler neck cap screwed into a filler neck has an advantage of being easy to ensure sealability of the filler neck. However, it has a disadvantage in that the attachment/detachment of the filler neck cap is cumbersome. There is also a possibility that sealing may be insufficient if a screw-in operation of the cap is inappropriate or that the detached filler neck cap may get lost. Considering these problems, a fuel filler port closing apparatus provided with a flapper is proposed. Such a fuel filler port closing apparatus has the flapper which opens by rotating downwardly when pushed by the fuel filling nozzle inserted from the outside and closes by rotating upwardly when the fuel filling nozzle is removed. According to the fuel filler port closing apparatus, forgetting to tighten the filler neck cap cannot occur. Further, since the filler neck cap is closed immediately before the fuel filling nozzle is inserted and opens only when the fuel filling nozzle is inserted (i.e., during actual fuel filling task of injecting fuel), discharge of fuel vapor can be suppressed at minimum.

A conventional fuel filler port closing apparatus has a configuration in which an opening at the nozzle guide for guiding a fuel filling nozzle inserted from the opening of the filler neck is opened and closed by a rotating flapper. Specifically, the flapper is attached so as to be pushed and biased upwardly by a torsion coil spring and to be freely downwardly rotatable. The flapper is rotated downwardly when pushed by the fuel filling nozzle inserted from the opening of the filler neck, thereby opens the opening of the nozzle guide. The flapper is rotated upwardly by the torsion coil spring when the fuel filling nozzle is removed, thereby closes the opening of the nozzle guide. Since the opening of the nozzle guide is at a deep position when seen from the opening of the filler neck, dust and rainwater tend to accumulate between the opening of the filler neck and the nozzle guide when the opening of the filler neck is exposed to the outside. This causes dust and rainwater to enter the fuel filling tube when the fuel filling nozzle is inserted and the flapper is pushed and opened. Therefore, the fuel filler port closing apparatus is normally provided with a cover that opens and closes the opening of the filler neck.

The fuel filler port closing apparatus disclosed in DE 20 2007 004 451 U1 is provided with a door (Tur104) that slides by being pushed with the fuel filling nozzle and thereby opens the opening of the filler neck. The door prevents dust and rainwater from entering the opening of the filter neck. DE 20 2007 004 451 U1 is characteristic that a regulation block (Durchlassbereich150) has two projections (150a, 150b) facing each other and spacing a distance that does not pass the diesel filling nozzle but passes the gasoline filling nozzle. The two projections (150a, 150b) are provided on the upstream of the door 104 when seen from the door. This utilizes the fact that the outer diameter of the diesel filling nozzle is larger than the gasoline filling nozzle. When a user moves the fuel filling nozzle towards the door from between the projections of the regulation block 150, only the gasoline filling nozzle can pass between the projections (150a, 150b) and push the door 104. Thus, the possibility of mistakenly filling diesel fuel is eliminated. Since the door 104 is biased in the closing direction, the user needs to insert the fuel filling nozzle into the opening of the filler neck while pushing the door 104 with the fuel filling nozzle that pushed and opened the door 104.

SUMMARY OF THE INVENTION

An object of the present invention is to provide a fuel filler port closing apparatus that can be adapted to fuel filling nozzles of various shapes and that excels in operability.

The fuel filler port closing apparatus disclosed in DE 20 2007 004 451 U1 is superior in that entering of dust and rainwater from the opening of the filler neck can be prevented by providing the door that opens and closes the opening of the filler neck, and that a function for discriminating the fuel filling nozzle to open and close the door is added. However, the fuel filler port closing apparatus disclosed in DE 20 2007 004 451 U1 has the following problems. Some fuel filling nozzles have a wounded coil for the purpose of preventing the fuel filling nozzle from carelessly dropping out from the filler neck while filling fuel. Such a fuel filling nozzle wound with the coil cannot be used in the fuel filler port closing apparatus disclosed in DE 20 2007 004 451 U1. This is because the fuel filling nozzle wound with coil cannot be inserted while pushing the door as the coil gets caught at the door.

The distal end of the fuel filling nozzle that pushes the door does not have a portion to engage. Therefore, the user needs to manipulate the fuel filling nozzle along a specific path and push the distal end of the fuel filling nozzle against the door while passing the nozzle between the projections of the regulation block, pushing the door from the side against the bias, and inserting the fuel filling nozzle from the opening of the filler neck while pushing the door. This means that the fuel filling nozzle is difficult to handle, and the elderly may not be able to successfully open the door and insert the fuel filling nozzle into the opening of the filler neck. In other words, the difficulty in manipulation of DE 20 2007 004 451 U1 is due to the fact that the manipulation is of a single action. Considering these problems, a fuel filler port closing apparatus that facilitates the handling of the fuel filling nozzle while adding the function of discriminating the fuel filling nozzle, similar to DE 20 2007 004 451 U1, is developed.

The above problem is solved by a fuel filler port closing apparatus in which a flapper, which closes an opening of a nozzle guide by being pushed and biased upwardly, is pushed and opened with a fuel filling nozzle inserted through an opening of a filler neck up to the opening of the nozzle guide; wherein the fuel filler port closing apparatus is provided with a cover upwardly rotatable with respect to the opening of the filler neck. The cover is configured by a rotation shaft arranged near the opening of the filler neck, a cover main body, which is biased upwardly and downwardly rotatable with respect to the opening of the filler neck, and a slider movably attached to an upper surface of the cover main body and biased towards a peripheral edge of the cover main body. The slider is arranged with a latch that engages to a latch receiver arranged on the filler neck side. Herein, the slider may be biased in any direction, as long as the slider is biased opposite to the rotation shaft and be movable. More preferably, the slider is movable in a direction orthogonal to the rotation shaft.

In the fuel filler port closing apparatus of the present invention, the cover that opens and closes the opening of the filler neck is not pushed and opened with the fuel filling nozzle. In the fuel filler port closing apparatus of the present invention, the cover (cover main body) is opened according to the upward bias by pushing the slider with the fuel filling nozzle, and disengaging the engagement of the latch receiver arranged near the opening of the filler neck and the latch. As an example, the upward bias of the cover main body is generated by the torsion coil spring loosely fitted to the rotation shaft. When the opening of the filler neck is closed, the slider returns to the initial position (starting position) before being pushed by the fuel filling nozzle since the slider is no longer pushed by the fuel filling nozzle and is biased. By pushing the cover downwardly, the slider again engages the latch to the latch receiver arranged near the opening of the filler neck. As a latch, the hook-shaped latch that narrows towards the lower side and has inclined surface slidably contacting to the latch receiver may be preferably adapted. According to the hook-shaped latch, the slider is temporarily pushed back by having the inclined surface slidably contact to the latch receiver, and slides forward again when the top of a projection of the hook-shaped latch rides over the latch receiver.

As the latch receiver arranged on the filler neck side, any member can be adopted as long as it receives a hook of the latch and keeps an engaged state and easily cancels engaged state. As examples, a penetrating hole made on a plate around the opening of the filler neck and an annular rib formed along the opening of the filler neck are exemplified.

The fuel filling nozzle that pushes the slider presses its distal end against the slider from a transverse direction against the bias. Therefore, if a member for determining the outer diameter of the fuel filling nozzle that passes therethrough is arranged in front of the portion where the slider and the fuel filling nozzle comes into contact, only the gasoline filling nozzle can push the slider and open the cover (cover main body). In other words, on the cover main body, a pair of outer projections facing each other at a width that does not pass the diesel filling nozzle but passes the gasoline filling nozzle is arranged in front of a starting end of the biased slider; and the slider is provided with an inner projection that engages the gasoline filling nozzle passed the interspace between the outer projections. In this way, the outer diameter of the fuel filling nozzle can be distinguished based on whether or not the nozzle can pass the interspace between the two outer projections, and only the gasoline filling nozzle passing the interspace between the outer projections can push the slider. Herein, the outer projection refers to the projecting portion formed on the cover main body, and the inner projection refers to the projecting portion formed on the slider. For example, two blocks projecting out on the slider may be the left and right inner projections, and left end and right end of the cover covering inner projections may be the left and right outer projections.

The number of the inner projection provided on the slider may be one if it has the size and the shape that can be pushed by the gasoline filling nozzle passed the interspace between the outer projections. However, the fuel filling nozzle having a round side surface may detach from the inner projection when pushed obliquely. Therefore, the slider is preferably provided with a pair of inner projections facing each other at a width that does not pass the gasoline filling nozzle passed the interspace between the outer projections, but passes a fuel filling nozzle narrower than the gasoline filling nozzle. In this configuration, the pair of inner projections comes into contact at two points with the round side surface of the fuel filling nozzle, and the pair of inner projections is less likely to detach. If the inner projections are spaced apart, non-standard fuel filling nozzle narrower than the gasoline filling nozzle can be pass the interspace between the inner projections. This means that only the fuel filling nozzle having an outer diameter of between the size (D-out) and the size (D-in), namely, only the gasoline filling nozzle can push the slider. In this case, "D-out" means the distance between the two outer projections and "D-in" means the distance between the two inner projections. In this manner, the fuel filler port closing apparatus in which only the gasoline filling nozzle pushes the slider and disengages the engagement of the latch to thereby open the cover is configured.

By modifying the above-mentioned fuel filler port closing apparatus in which only the gasoline filling nozzle pushes the slider to open the cover (cover main body), the fuel filler port closing apparatus in which only the diesel filling nozzle can push the slider to open the cover (cover main body) can be configured. Specifically, on the cover main body, a pair of outer projections facing each other at a width (D-out) that passes a diesel filling nozzle but does not pass a fuel filling nozzle thicker than the diesel filling nozzle is arranged in front of the starting end of the biased slider. The slider is provided with a pair of inner projections, which engages the diesel filling nozzle passed between the outer projections and which faces each other at a width (D-in) that passes the gasoline filling nozzle passed between the same outer projections. According to this configuration, only the fuel filling nozzle having an outer diameter smaller than the size (D-out) and larger than the size (D-in), that is, only the diesel filling nozzle, can push the slider to disengage the engagement of the latch to open the cover.

According to the fuel filler port closing apparatus of the present invention, the slider may be pushed with the fuel filling nozzle only when the cover (cover main body) is needed to be opened. When the slider is pushed, the latch and the latch receiver disengage and the cover opens according to the upward bias. Since the cover goes up following the bias to expose the opening the filler neck, the fuel filling nozzle can be inserted into the opening of the filler neck without interfering with the opened cover. This means that even the fuel filling nozzle wound with coil can be inserted from the opening of the filler neck without being caught. Thus, the fuel filler port closing apparatus of the present invention has advantages in that the operation of opening the cover (cover main body) and inserting the fuel filling nozzle to the opening of the filler neck after opening the cover (cover main body) are facilitated, and in that the fuel filling nozzle can be very easily handled as a whole.

The fuel filler port closing apparatus of the present invention adapts the operation of pushing the slider to the side with the distal end of the fuel filling nozzle, which is inserted through the space formed by the outer projections arranged on the cover main body and push the inner projections. According to this operation, only the gasoline filling nozzle or only the diesel filling nozzle can push the slider and open the opening of the filler neck. This means that gasoline or diesel fuel will not be mistakenly filled. Furthermore, since the slider cannot be pushed with the fuel filling nozzle other than the gasoline filling nozzle or the diesel filling nozzle, the cover (cover main body) cannot be opened therewith. Therefore, only either the gasoline or the diesel fuel can be filled.

DETAILED DESCRIPTION OF THE PREFERRED EMBODIMENTS

Figure 1:
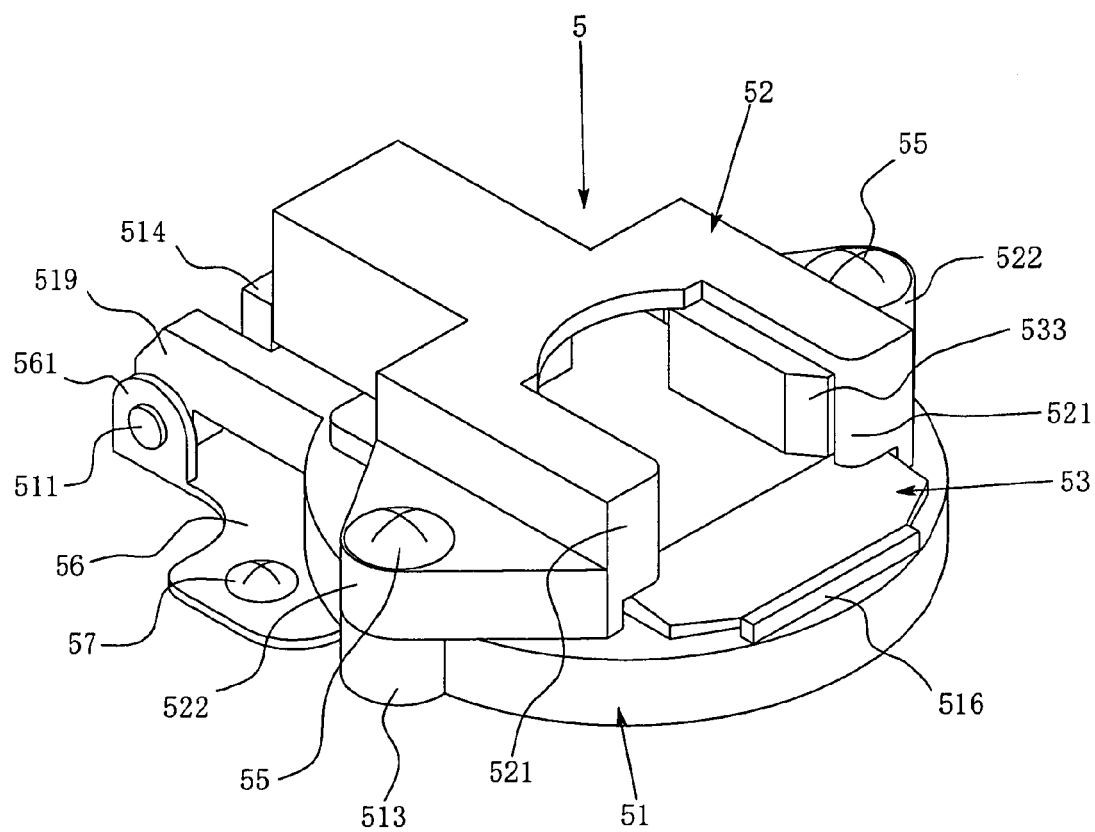
FIG. 1 is a perspective view illustrating one example of a cover based on the present invention.
Figure 2:
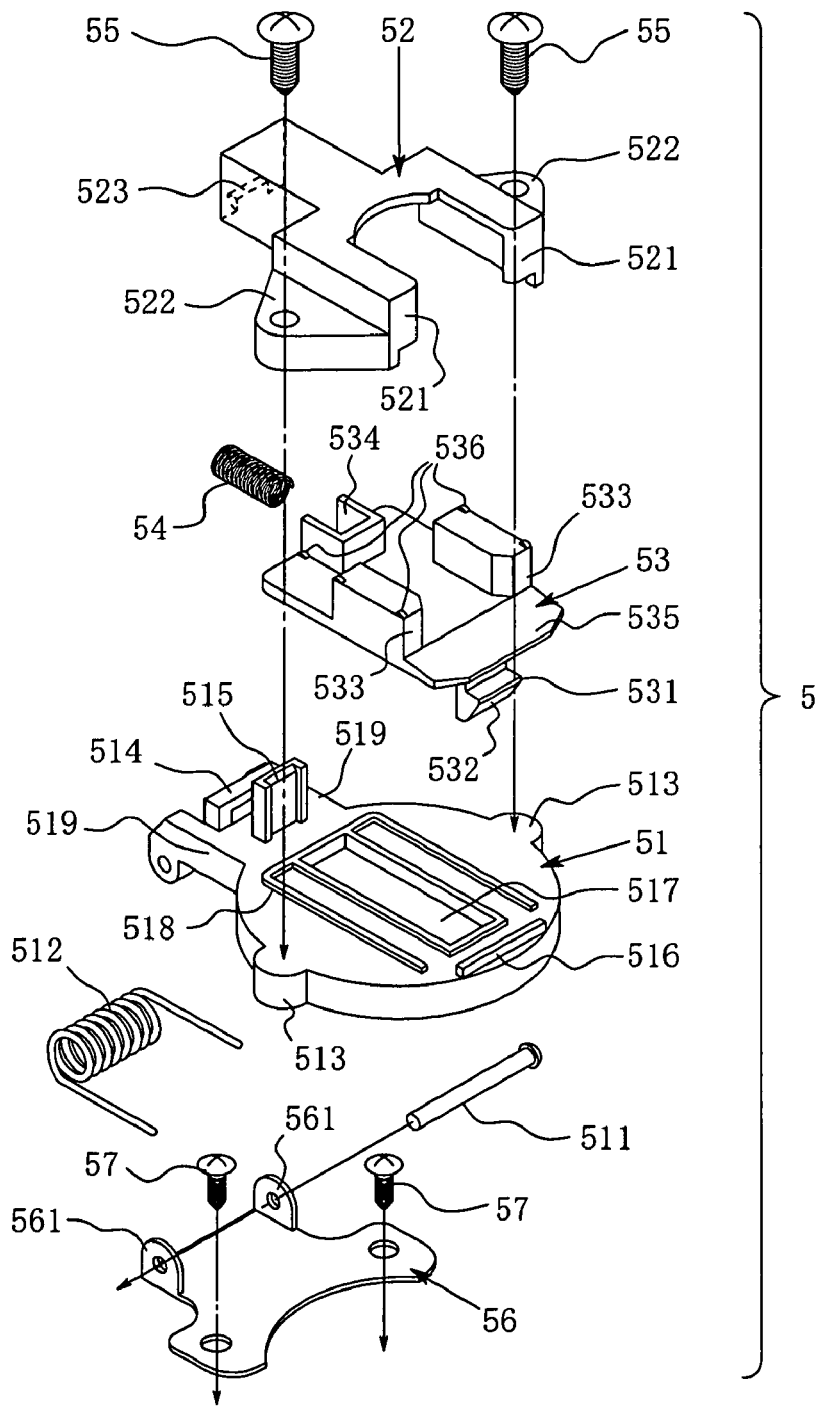
FIG. 2 is an exploded perspective view of the cover of the present example (Example 1).
Figure 3:
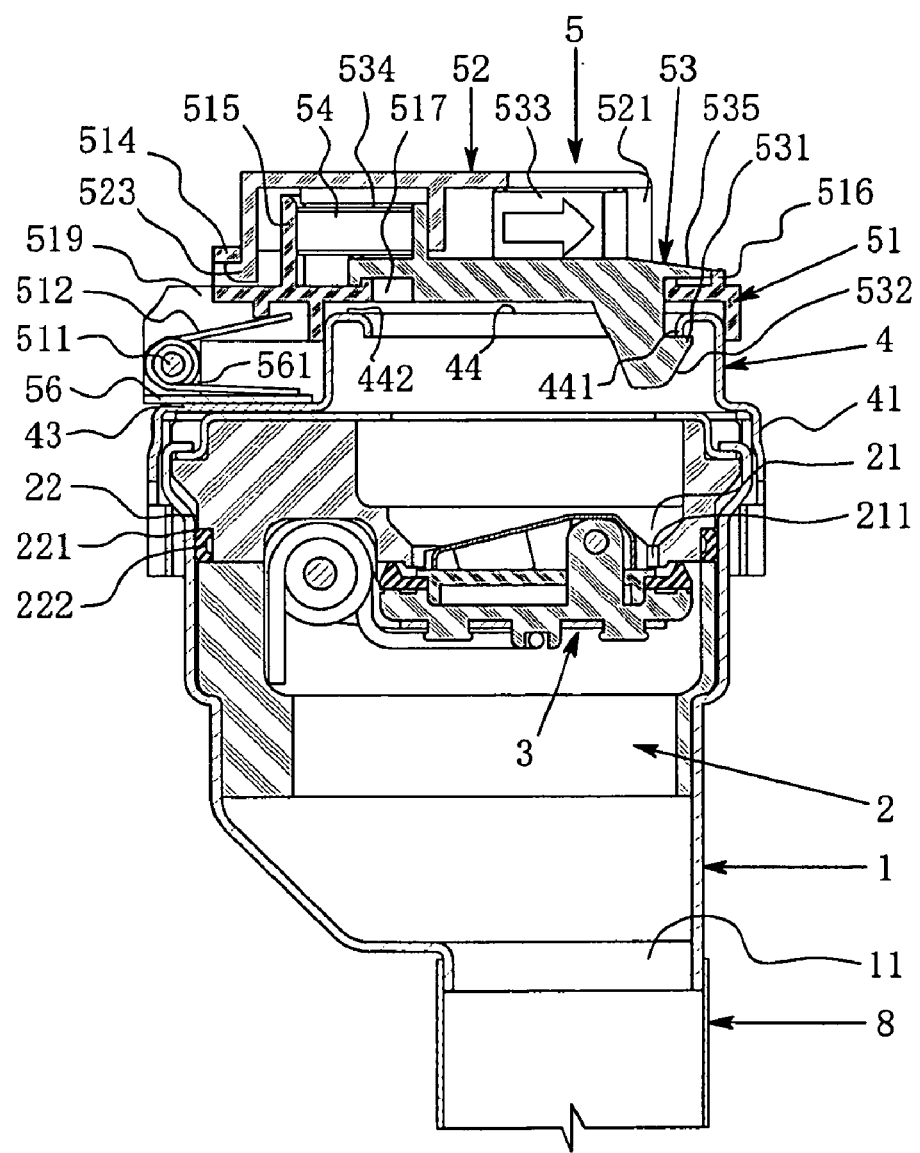
FIG. 3 is a cross-sectional view of a fuel filler port closing apparatus using the cover of the present example (Example 1).
Figure 4:
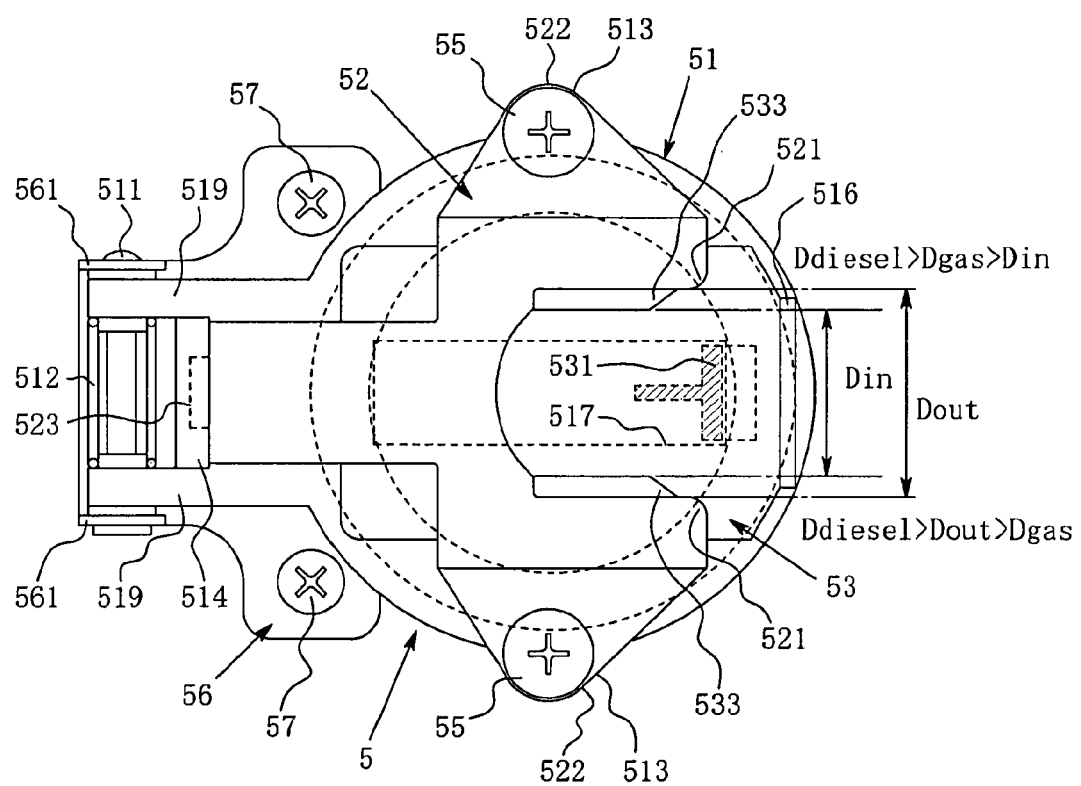
FIG. 4 is a plan view of the cover of the present example (Example 1).
Figure 5:
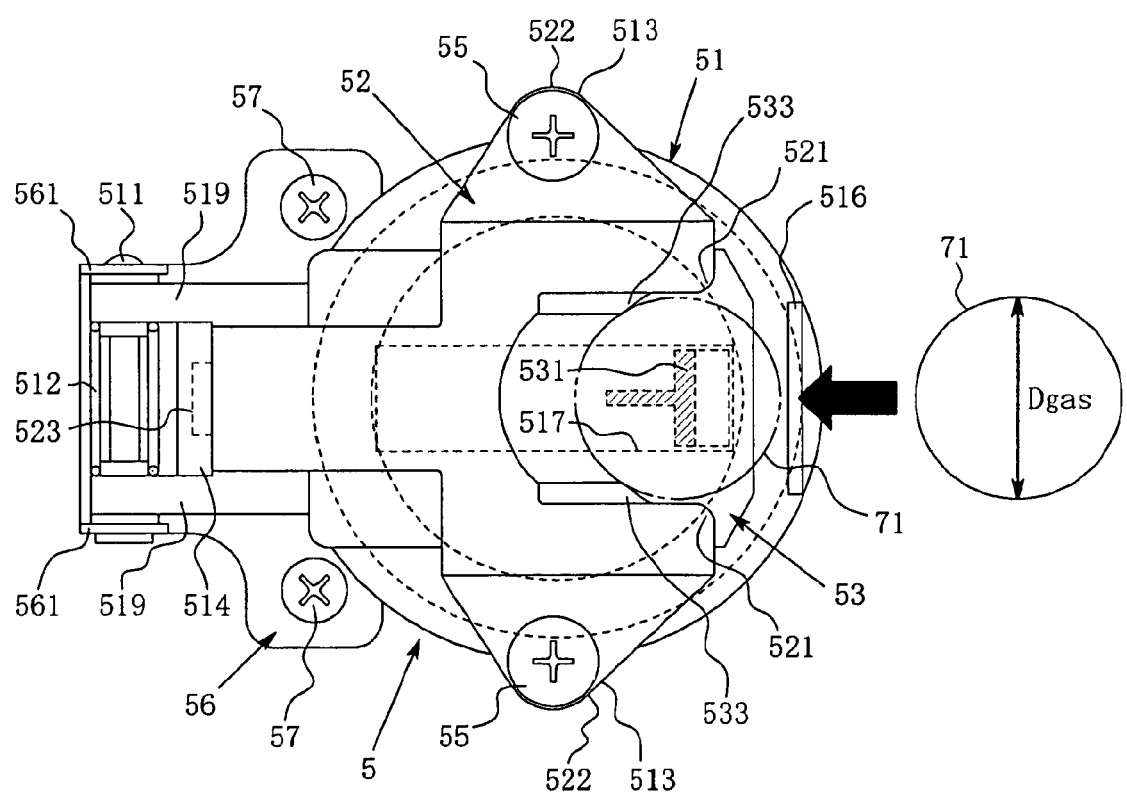
FIG. 5 is a plan view corresponding to FIG. 4 illustrating a state of pushing a slider with a gasoline filling nozzle.
Figure 6:
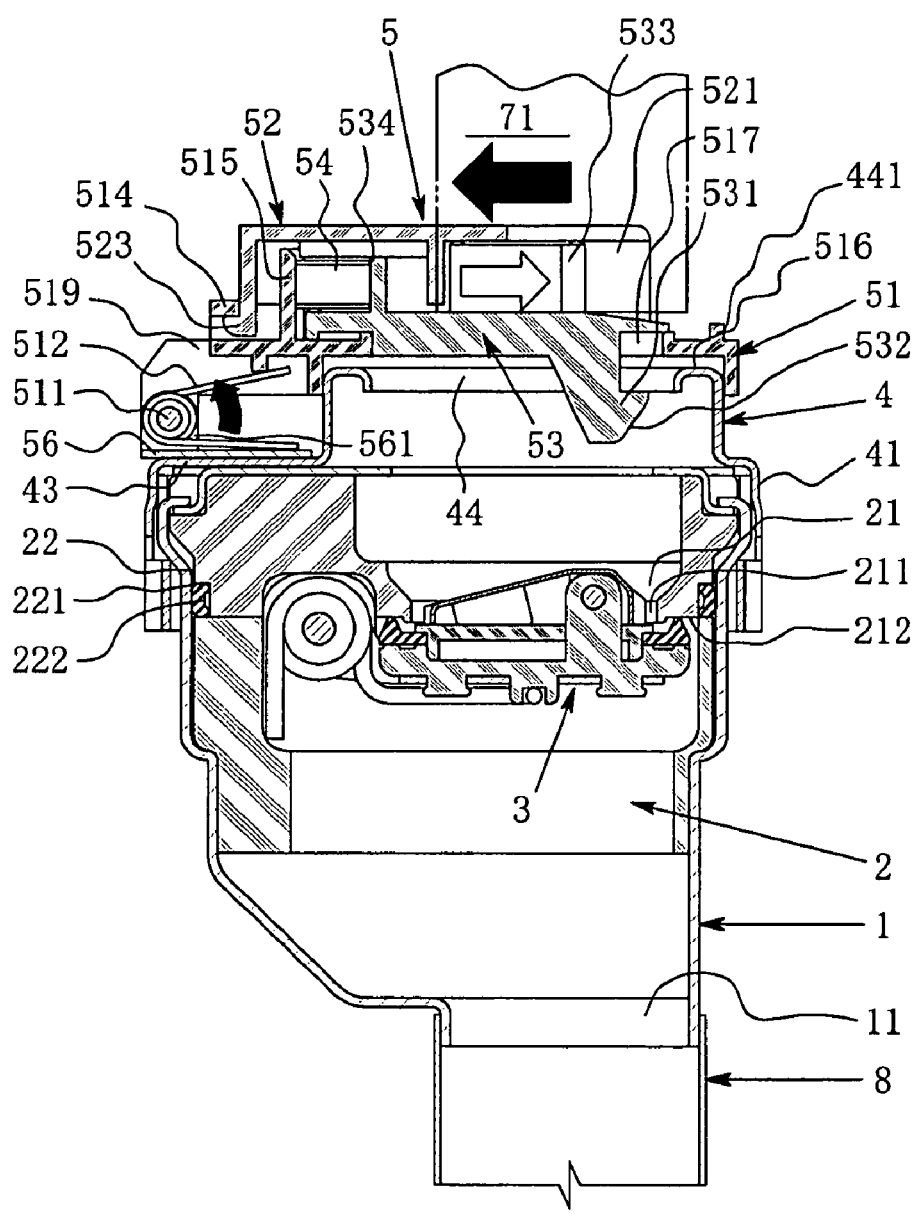
FIG. 6 is a cross-sectional view corresponding to FIG. 3 illustrating a state of pushing the slider with the gasoline filling nozzle.
Figure 7:
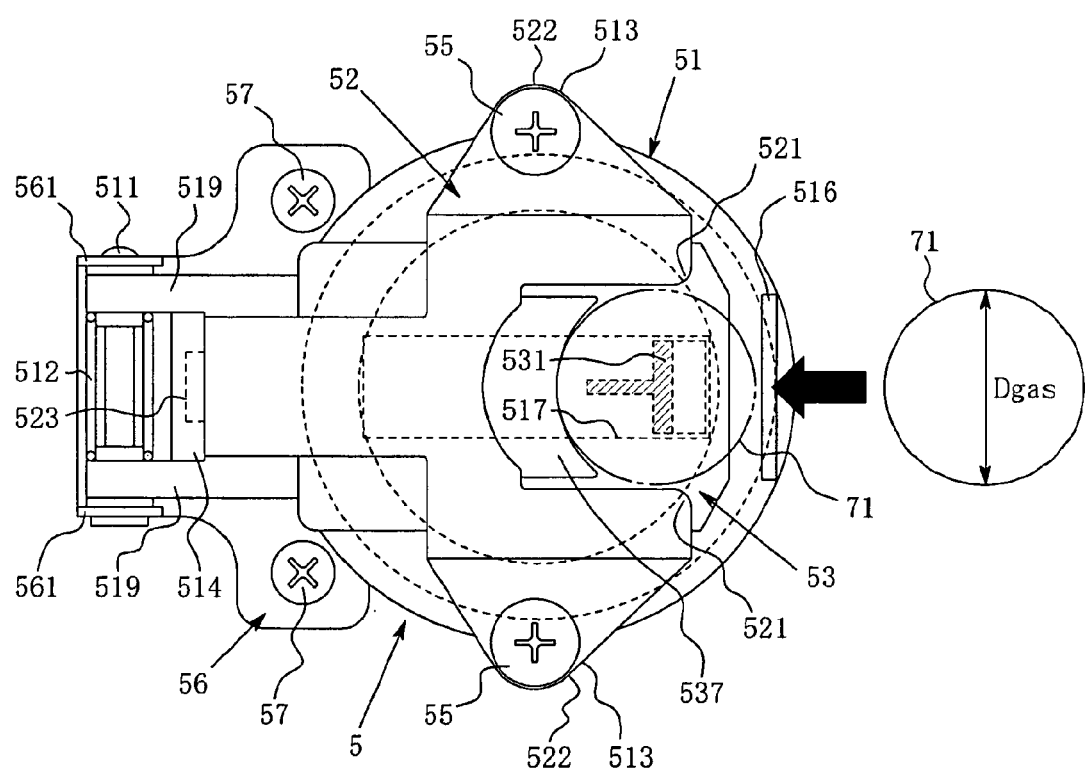
FIG. 7 is a plan view corresponding to FIG. 4 illustrating a state of pushing the slider of another example (Example 2) with the gasoline filling nozzle.
Figure 8:
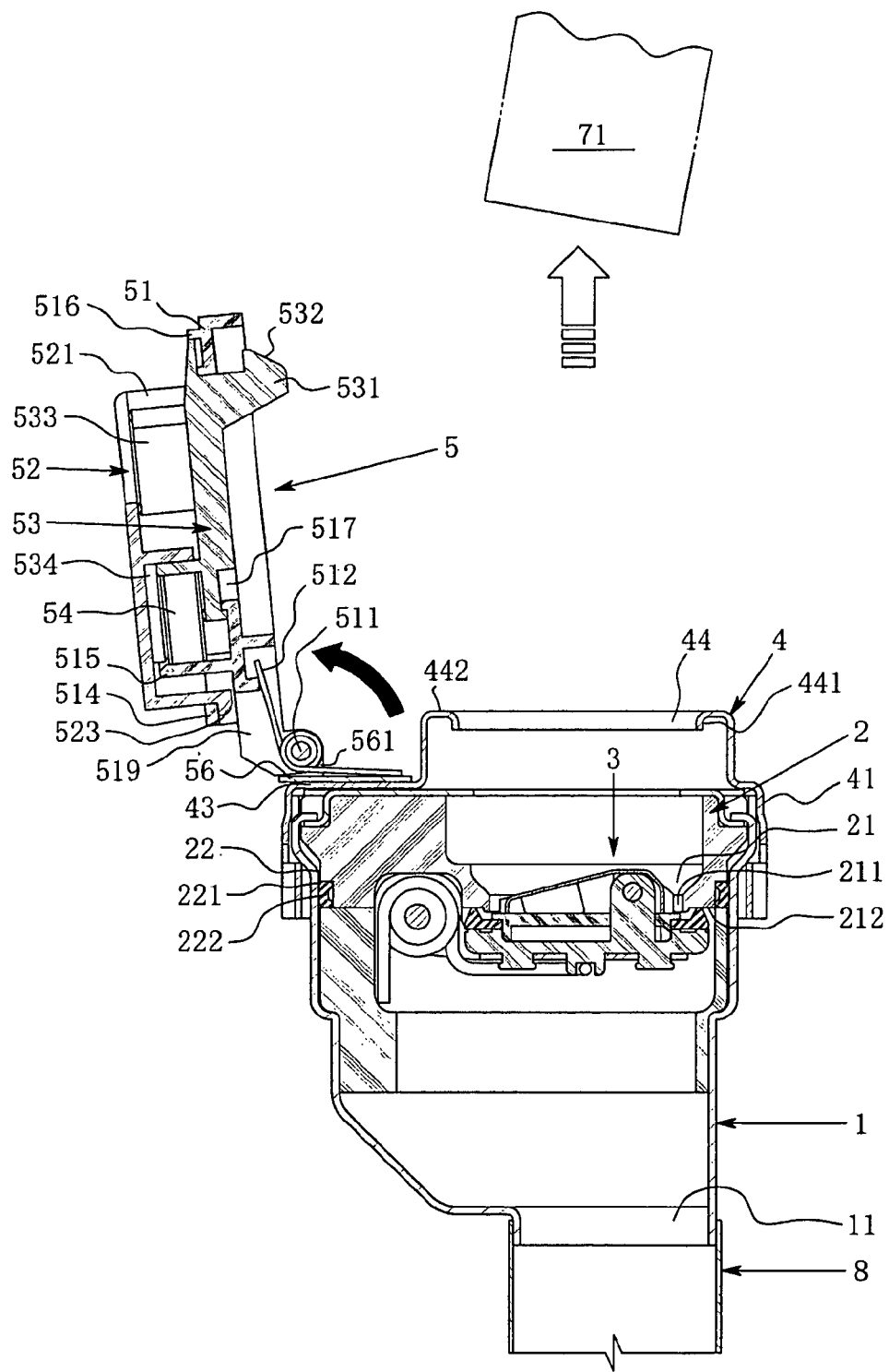
FIG. 8 is a cross-sectional view corresponding to FIG. 3 illustrating a state in which the cover is completely opened with the gasoline filling nozzle.
Figure 9:
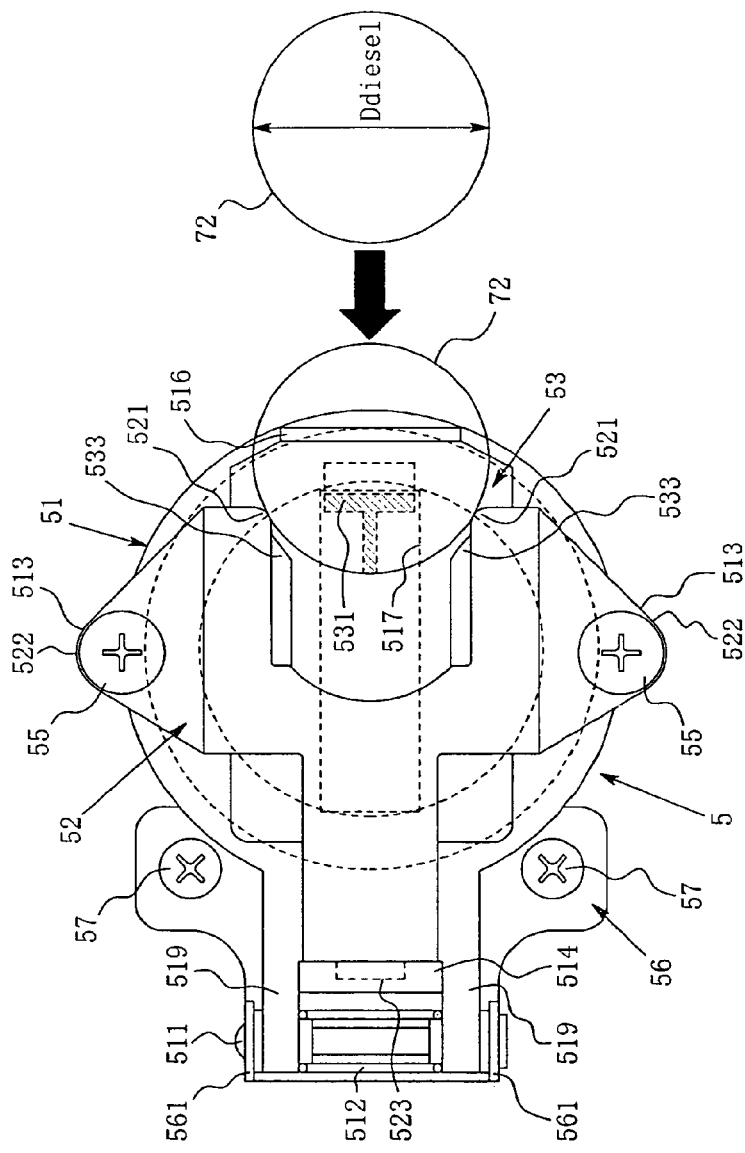
FIG. 9 is a plan view corresponding to FIG. 4 illustrating a state of attempting to push the slider with a diesel filling nozzle.
Figure 10:
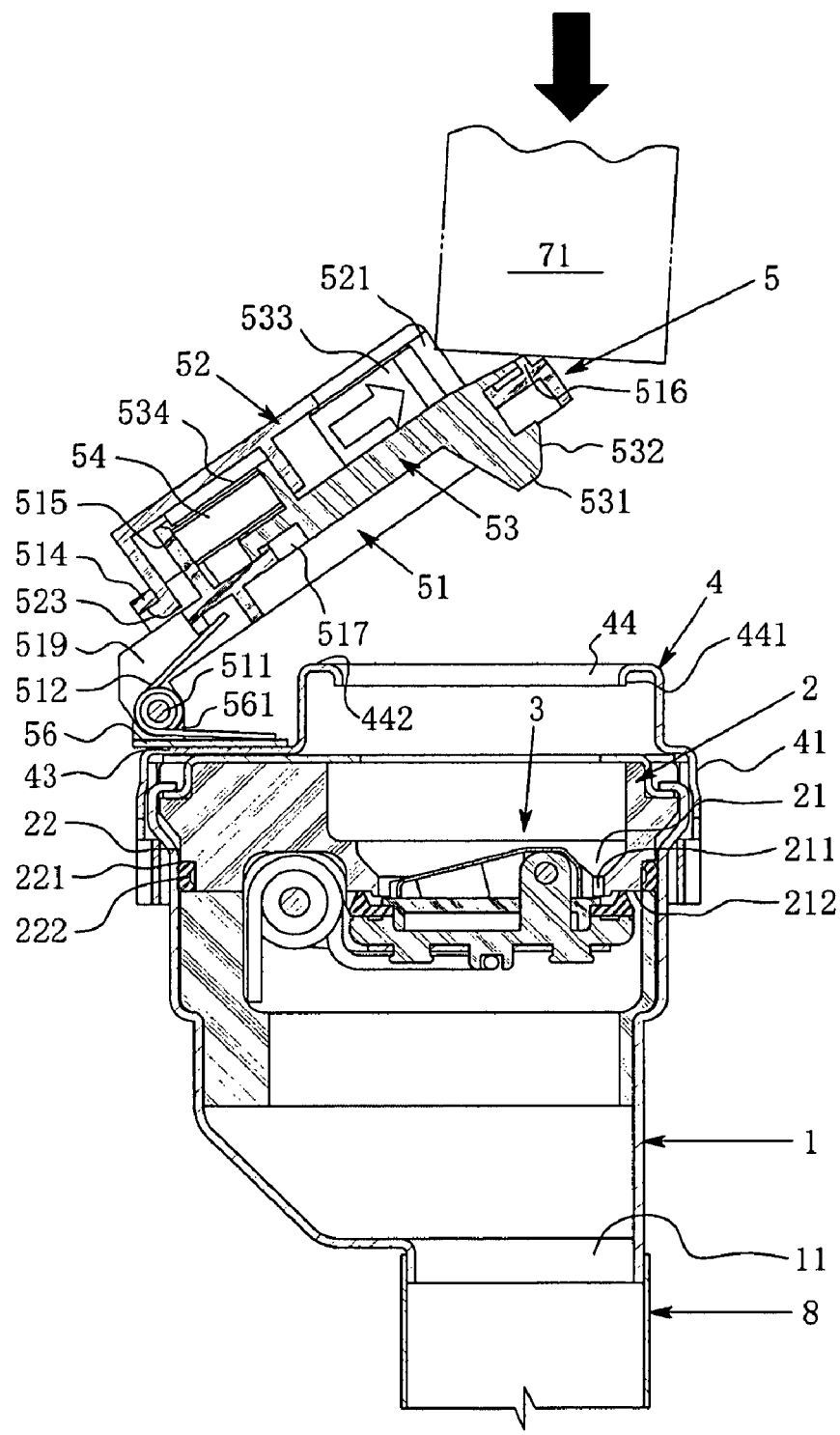
FIG. 10 is a cross-sectional view corresponding to FIG. 3 illustrating a state in which the cover is pushed down with the gasoline filling nozzle.
Figure 11:
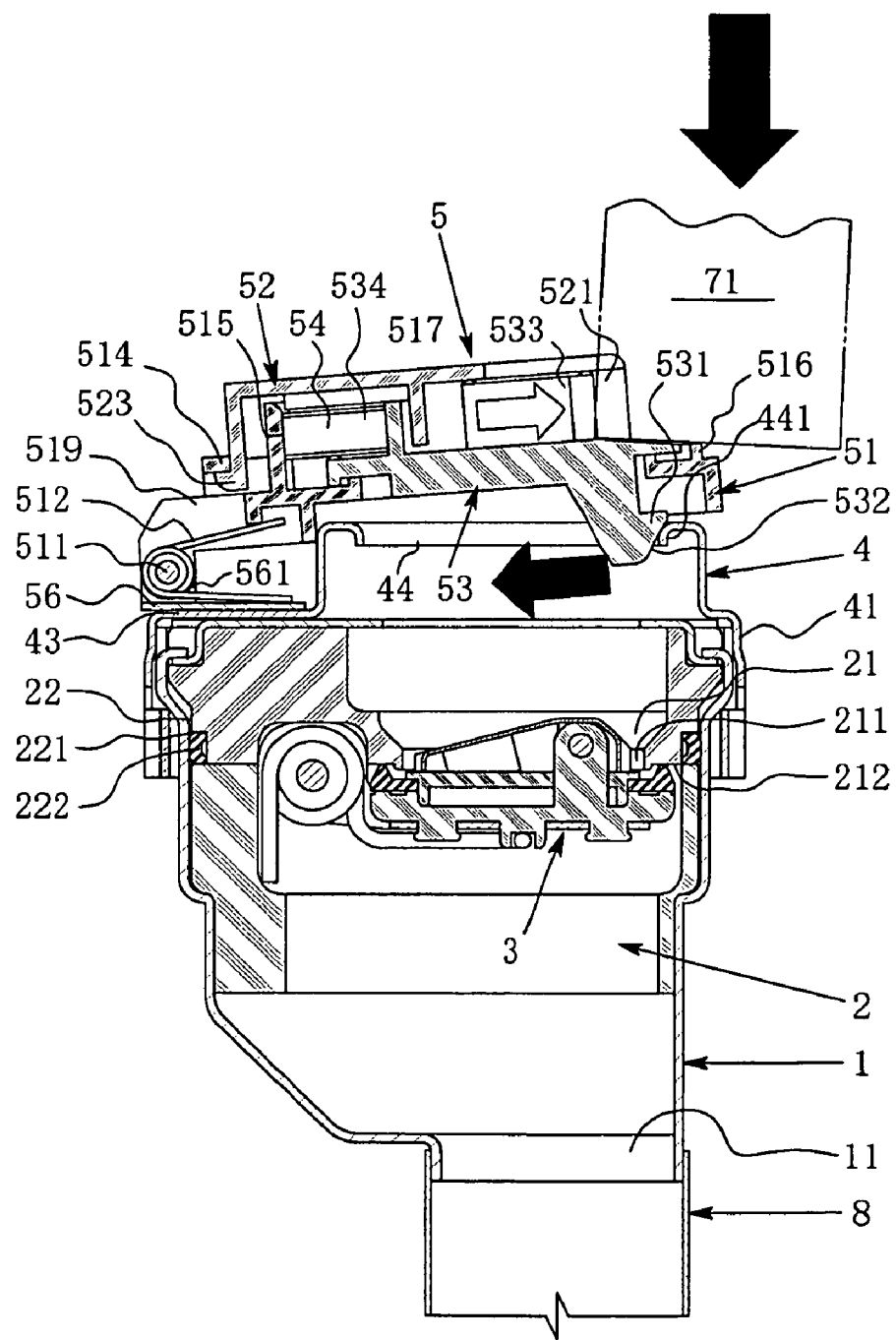
FIG. 11 is a cross-sectional view corresponding to FIG. 3 illustrating a state in which the cover is completely closed.

A preferred embodiment for implementing the present invention is described below with reference to the drawings. FIG. 1 is a perspective view illustrating one example of a cover based on the present invention. FIG. 2 is an exploded perspective view of the cover of the present example. FIG. 3 is a cross-sectional view of a fuel filler port closing apparatus using the cover of the present example. FIG. 4 is a plan view of the cover of the present example. FIG. 5 is a plan view corresponding to FIG. 4 illustrating a state of pushing a slider with a gasoline filling nozzle. FIG. 6 is a cross-sectional view corresponding to FIG. 3 illustrating a state of pushing the slider with the gasoline filling nozzle. FIG. 7 is a plan view corresponding to FIG. 4 illustrating a state of pushing the slider with the gasoline filling nozzle of another example. FIG. 8 is a cross-sectional view corresponding to FIG. 3 illustrating a state in which the cover is completely opened with the gasoline filling nozzle. FIG. 9 is a plan view corresponding to FIG. 4 illustrating a state of attempting to push the slider with the diesel filling nozzle. FIG. 10 is a cross-sectional view corresponding to FIG. 3 illustrating a state in which the cover is pushed down with the gasoline filling nozzle. FIG. 11 is a cross-sectional view corresponding to FIG. 3 illustrating a state in which the cover is completely closed.

As illustrated in FIGS. 1 to 4, a cover 5 of the present example is attached to a cover unit 4 by way of an attachment plate 56 with respect to a filler neck 1, and opens and closes an opening 44 of the filler neck formed in the cover unit 4. The cover unit 4 is for facilitating the assembly of the fuel filler port closing apparatus. If the cover unit 4 is not used, the opening at the upper end of the opened filler neck 1 becomes the opening of the filler neck, and the cover 5 is attached to the peripheral edge of the opened portion at the upper end by way of the attachment plate 56. In this case, a latch receiver that forms a pair with a latch 531 for maintaining the closed state of the cover 5 needs to be arranged on the opening at the upper end of the filler neck 1.

The cover 5 is configured by a cover main body 51 pivotally attached to the attachment plate 56, a slider 53 that slidably comes into contact with the upper surface of the cover main body 51, and a holding member 52 for sandwiching and holding the slider 53. The attachment plate 56 is a metal plate member having a front edge cut to a circular-arc shape along the outer periphery of the filler neck 1. The attachment plate 56 comes into contact with a surface of a top panel 43 of the cover unit 4, and is fixed by attachment screws 57, 57. The cover 5 is pivotally attached to a rotation shaft 511 bridged across a pair of left and right supporting flanges 561, 561 arranged upstanding at the back side of the attachment plate 56. A torsion coil spring 512 for biasing the cover main body 51 in a direction orthogonal to the rotation shaft 511 (direction of opening the cover 5) is loosely fitted to the rotation shaft 511, where one end is pressed against the attachment plate 56 and the other end is pressed against the cover main body 51.

The cover main body 51 is a resin member having rotation arms 519, 519 projecting out towards the back side from a disc of a size that can cover the opening 44 of the filler neck from the upper side. The rotation arm 519 is formed with a hole for passing the rotation shaft 511, and the cover main body 51 is pivotally attached to the supporting flange 561 of the attachment plate 56 by way of the rotation shaft 511. The cover main body 51 of the present example has lower coupling projections 513, 513 protruding out at the left and the right, where a stopper 516, rail 518 for the slider 53 and a groove 517 for accommodating the latch 531, a flange 515 for receiving a spring, and an engagement hole 514 for receiving a locking nail 523 are arranged on the upper surface in order from the front side to the back side.

Coupling screws 55, 55 are screwed into the lower coupling projections 513, 513 through the corresponding upper coupling projections 522, 522 of the holding member 52. The engagement hole 514 engages the locking nail 523 arranged at the back end of the holding member 52. The cover main body 51 and the holding member 52 are thereby integrated so as not to rattle through the coupling of the coupling screws 55, 55, and the engagement of the locking nail 523 and the engagement hole 514.

The rail 518 is configured by four protrusions extending in a direction orthogonal to the rotation shaft 511 (opening/closing direction of the cover 5) and one short protrusion connecting the back end of each protrusion in the left and right direction. The two of four protrusions on the inner side are arranged along the groove for accommodating the latch 532 so that the two protrusions sandwich the groove 517. Since the slider 53 is supported only by four protrusions, friction resistance between the slider 53 and cover main body 51 can be suppressed and slidable movement can be stable without rattling. The stopper 516 locks the front edge of the slider 53 that slidably moves on the rail 518, and regulates the forward movement of the slider 53.

The groove 517 movably accommodates the latch 531 formed on the lower surface of the slider 53. The lower end of the latch 531 projects out from the lower surface of the cover main body 51 when the slider 53 sets onto the cover main body 51. The flange 515 for receiving the spring supports the back end of a coil spring 54 accommodated in a spring accommodating portion 534 of the slider 53, and compresses the coil spring 54 in response to the backward movement of the slider 53.

The slider 53 is a resin plate having a rectangular shape in plan view in which the right and left rails 518 of the cover main body 51 correspond to the left and right edges of the rectangle, the latch 531 is arranged at the front end of the lower surface, a pair of inner projections 533, 533 is arranged on the front side on the upper surface, and the spring accommodating portion 534 is arranged at the middle of the back end on the upper surface. In addition, the slider 53 of the present example has an inclined surface 535 (see FIG. 2) for guiding a gasoline filling nozzle 71 (see FIGS. 5 and 6) along gradual inclination to the inner projections 533.

The inner projections 533, 533 are faced to each other and lined at a distance (D-in) that engages the gasoline filling nozzle 71. Each inner projection 533 of the present example has the corner at the inner front edge facing the counterpart chamfered so that the left and right inner projections 533, 533 can equally engage the gasoline filling nozzle 71. Two projections 536, 536 of circular arc shape in side view are arranged on the upper surface of each inner projection 533 for the purpose of reducing the friction resistance with respect to the holding member 52. The projection 536 is arranged at the front end and the back end of the inner projection 533. The left and right projections 536, 536 are also arranged along the left and right wall surfaces of the spring accommodating portion 534.

The latch 531 is a portion having a triangular shape in side view. The latch 531 projects out through the groove of the cover main body 51, where the front surface is formed to an inclined surface 532 of wide width, and the rear surface is arranged with an orthogonal rib for reinforcement. The inclined surface 532 comes into contact with the inner peripheral edge of the opening 44 of the filler neck when closing the opened cover 5, and rides over the inner peripheral edge by moving the slider 53 (including latch 531) backward, so that the latch 531 again engages the latch receiver 441. In this example, an annular rib formed at the inner peripheral lower edge of the opening 44 of the filler neck functions as the latch receiver 441.

The holding member 52 is a resin member having a Y-shape in plan view, having the expanded (opened) portion of the "Y" at the front side and a root portion of the "Y" at the back side. The holding member 52 has the upper coupling projections 522 protruding to the left side and right side in plan view. Further, the holding member 52 has the locking nail 523 at the back side. A left end and right end of the "Y"-shaped expanded portion function as outer projections 521, 521 in the present example. The left outer projection 521 and right outer projections 521 face each other and are lined spacing a distance corresponding to the size (D-out) that engages the diesel filling nozzle 72. The outer projections 521, 521 of the present example are attached so as to be positioned immediately before the inner projections 533, 533 when the holding member 52 is integrated with the cover main body 51 with the slider 53 in between. Since the holding member 52 covers most of the each inner projection 533, only the chamfered corner at the inner front edge of the each inner projection 533 is exposed.

Whole structure of the fuel filler port closing apparatus of the present example applied with the present invention is described below. As shown in FIG. 3, the fuel filler port closing apparatus of the present example is configured by the filler neck 1, the closure unit 2, and the cover unit 4. The closure unit 2 is attached with the flapper 3 that is pushed down by the gasoline filling nozzle 71 (see FIGS. 5 and 6) inserted from the opening 44 of the filler neck of the cover unit 4 to thereby open the opening 211 of the nozzle guide. The cover unit 4 is pivotally attached with the upwardly rotatable cover 5. The cover 5 opens and closes the opening 44 of the filler neck.

The filler neck 1 is a tubular member integrally formed from one plate material through drawing process. The shape of the filler neck 1 is such that the opening at the upper end is wide and a connection port 11 having the opening at the lower end is narrowed in accordance with an fuel filling tube main body 8 to be connected. The closure unit 2 is a member made of synthetic resin. The closure unit 2 is formed with a nozzle guide 21 for guiding the gasoline filling nozzle 71 (see FIGS. 5 and 6) inserted from the opening 44 of the filler neck. The flapper 3 that opens and closes the opening 211 of the nozzle guide is integrally assembled near the opening 211 of the nozzle guide. The opening 211 localizes at the bottom of the nozzle guide 21. At the unit peripheral surface 22, an annular groove 221 is formed near the upper edge and a seal ring 222 is fitted thereto. The seal ring 222 pressure contacts to the inner side of the peripheral surface of the filler neck 1 and blocks the gap when the closure unit 2 is fitted into the filler neck 1, thereby ensuring sealability other than at the opening 211 of the nozzle guide.

As previously described, the cover unit 4 is a member provided with the opening 44 of the filler neck, which is opened and closed by the cover 5. The cover unit 4 is configured by the top panel 43 for attaching the attachment plate 56 of the cover 5 and a peripheral surface 41 continuing from the top panel 43. In this example, the opening 44 of the filler neck is defined by a ring shaped flange 442. The ring shaped flange 442 is formed by folding a plate of the cover unit 4 twice. That is, once folding the plate inwards with respect to the radial direction of the opening 44 and then folding the end of the plate downwards. The annular rib 441 of the ring-shaped flange functions as the latch receiver 441 in this example, and engages the latch 531 to maintain the cover 5 in the closed state.

The cover 5 prevents rainwater and dust from accumulating at the opening 211 of the nozzle guide. The cover 5 of the present invention can distinguish the fuel filling nozzles 71, 72 to be used for filling fuel. Specifically, the D-out (the distance between the pair of outer projections 521) is narrower than the diesel filling nozzle 72, and wider than the gasoline filling nozzle 71. The D-in (the distance between the pair of inner projections 533 arranged on the slider 53) is narrower than the gasoline filling nozzle 71. Therefore, only the gasoline filling nozzle 71 engages to the inner projections 533, 533 and pushes the slider 53 to disengage the latch 531 and the latch receiver 441.

The procedure in which the gasoline filling nozzle 71 opens the cover 5 is described in FIG. 2, FIG. 4, FIG. 5 and FIG. 6. The gasoline filling nozzle 71 is parallel moved along the inclined surface 535 towards the slider 53 that keeps the closed state of the cover 5. The D-out (the distance between the pair of outer projections 521) is set to a size that passes the gasoline filling nozzle 71 (D-gas) but does not pass the diesel filling nozzle 72 (D-diesel). Therefore, the gasoline filling nozzle 71 moved along the inclined surface 535 can pass the interspace defined by the outer projections 521, 521, and engage the inner projections 533, 533. Hence, the engaged gasoline filling nozzle push the slider 53, as illustrated in FIGS. 5 and 6. In the figures, the outer diameter of the gasoline filling nozzle 71 is represented by D-gas and that of the diesel filling nozzle 72 is represented by D-diesel.

The pair of left and right inner projections 533, 533 is arranged with a spacing of the D-in, so that a non-standard fuel filling nozzle having an outer diameter narrower than the D-in can pass therethrough. Therefore, a non-standard fuel filling nozzle cannot push the slier 53. In other words, only the gasoline filling nozzle 71 can push the slider 53. The pair of left and right inner projections 533, 533 functions as two pushing points at symmetrical positions by the fuel filling nozzle 71, and has a merit in that the slider 53 can be stably and reliably pushed. However, if it is sufficient to simply prevent the slider 53 from being pushed with the diesel filling nozzle 72, an inner projection 537 having a circular arc shape in front view along the outer surface shape of the gasoline filling nozzle 71 as illustrated in FIG. 7 may be provided in place of the inner projections 533, 533 of the present example.

The slider 53 pushed by the gasoline filling nozzle 71 moves backward i.e., towards the rotation shaft 511 of the cover 5, and detaches the latch 531 from the latch receiver 441 arranged on the opening 44 of the filler neck. The cover 5 is constantly biased in the opening direction by the torsion coil spring 512. Therefore, the cover 5 opens when the latch 531 and the latch receiver 441 are disengaged (see FIG. 8). Since the slider 53 is biased in the forward moving direction by the coil spring 54, the slider 53 returns to the initial position when the gasoline filling nozzle 71 is moved away.

Even if the diesel filling nozzle 72, having an outer diameter larger than the gasoline filling nozzle 71 (D-diesel>D-gas), is moved closer to the inner projections 533, 533 along the inclined surface 535 of the slider 53, the diesel filling nozzle 72 gets caught at the outer projections 521, 521 and cannot push the inner projections 533, 533 (see FIG. 9). Also, the D-in (the distance between the inner projections 533, 533) is smaller than the outer diameter (D-gas) of the gasoline filling nozzle 71, the diesel filling nozzle 72 obviously cannot be pushed in. Therefore, the inner projections 533, 533 never pushed in with the diesel filling nozzle 72. This means that the diesel fuel will not be mistakenly filled since the cover 5 cannot be opened with the diesel filling nozzle 72.

In order to close the cover 5, the cover 5 is held down by the gasoline filling nozzle 71, as illustrated in FIG. 10. When closing the cover 5, the slider 53 comes back at the initial position before being pushed by the fuel filling nozzle since the slider is biased forward by the coil spring 54 and no longer pushed by the gasoline filling nozzle 71. The latch 531 of the slider 53 is at the position engaging the latch receiver 441 in this state. If the cover 5 is continuously pushed down by the gasoline filling nozzle 71, the slider 53 is temporarily moved backward while having the inclined surface 532 of the front surface of the latch 531 slayable contact with the latch receiver 441, and then the top of the latch 531 rides over the latch receiver 441, as illustrated in FIG. 11. When the top of the latch 531 rides over the latch receiver 441, the slider 53 again moves forward by the bias of the coil spring 54, thereby engaging the latch 531 to the latch receiver 441.

According to the fuel filler port closing apparatus of the present invention, the slider 53 of the cover 5 may be pushed by the gasoline filling nozzle 71 only when the cover 5 needs to be opened. Therefore, the gasoline filling nozzle 71 can be moved away from the slider 53 while the cover 5 is opening. This means that the cover 5 can be easily opened even with the fuel filling nozzle wounded with coil. By combining the function of distinguish the fuel filling nozzles to such simple opening/closing operations of the cover 5, only the gasoline filling nozzle 71 can open the cover 5 to fill fuel. Thus, the present example provides a fuel filler port closing apparatus capable of filling only gasoline.

Figure 12:
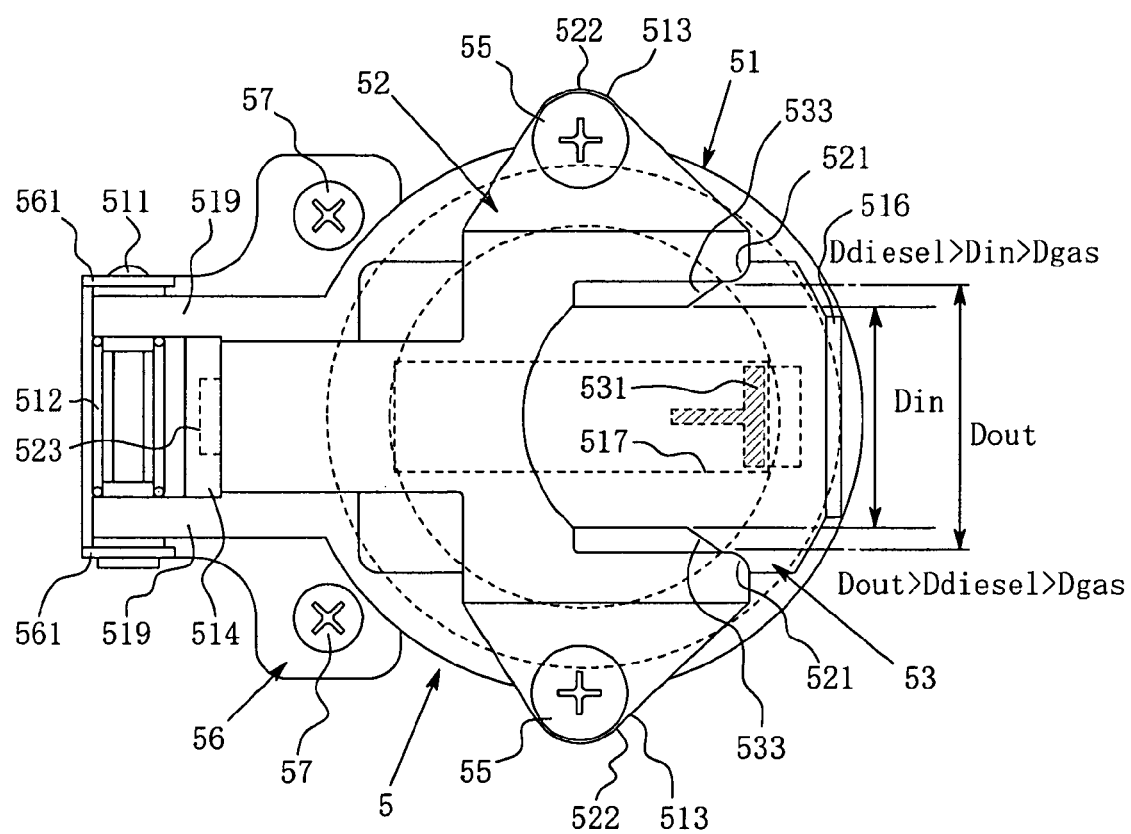
FIG. 12 is a plan view of a cover of another example (Example 3).
Figure 13:
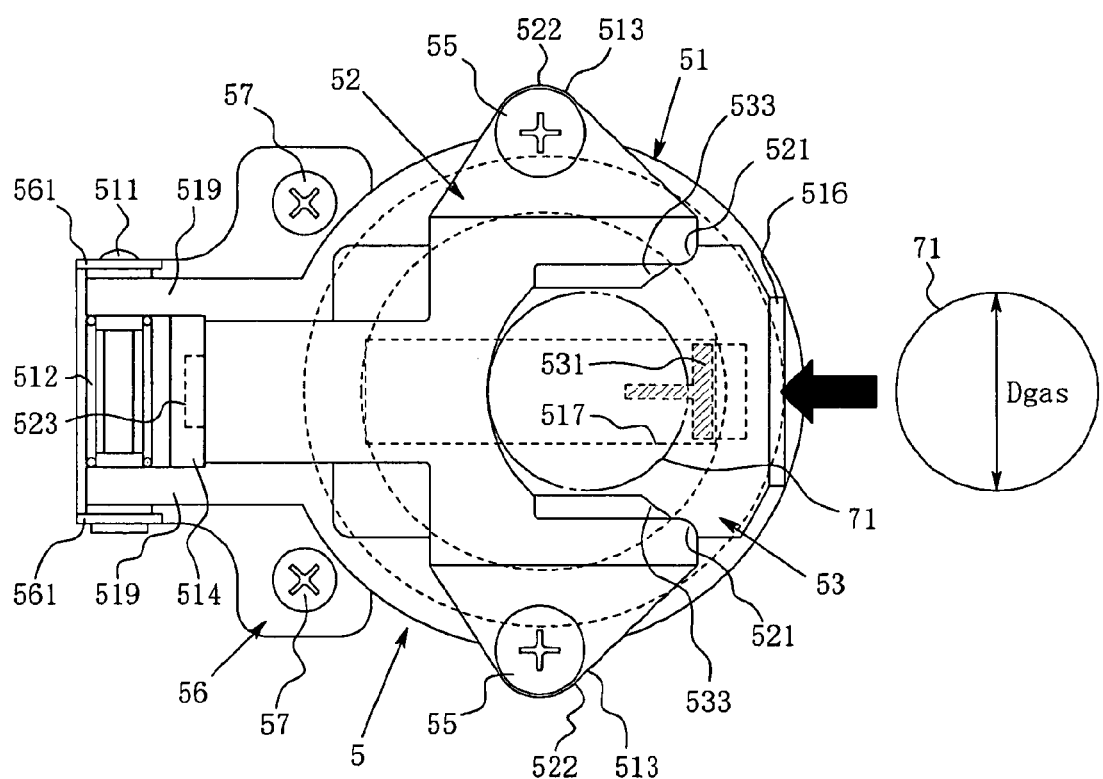
FIG. 13 is a plan view corresponding to FIG. 12 illustrating a state of attempting to push the slider with the gasoline filling nozzle.
Figure 14:
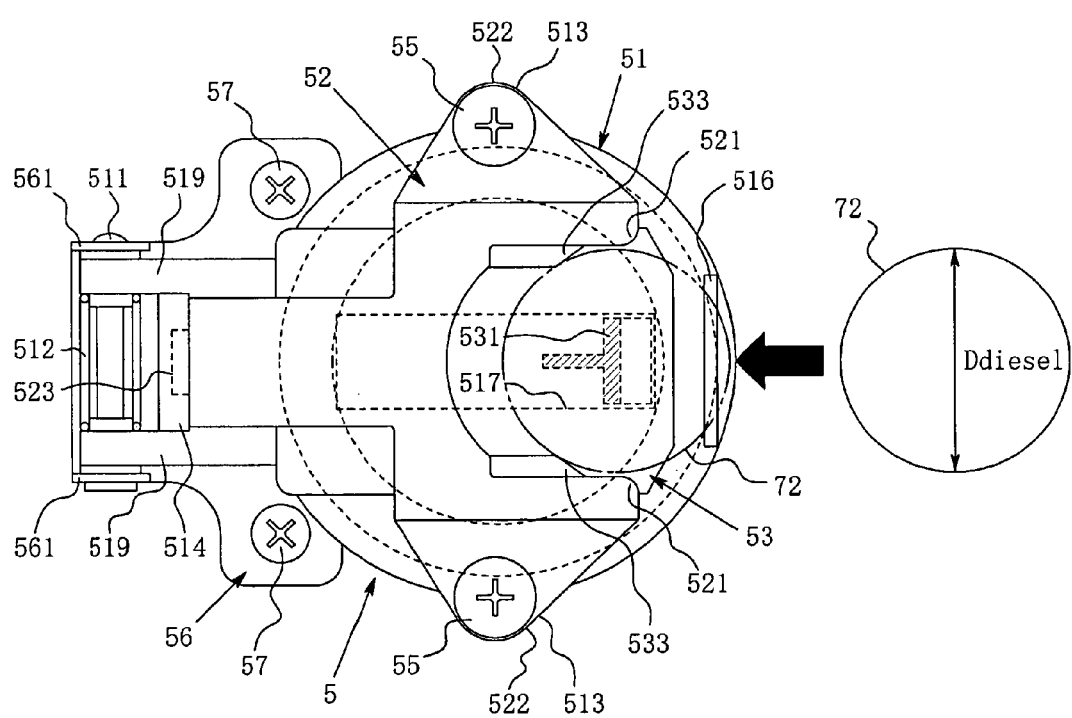
FIG. 14 is a plan view corresponding to FIG. 12 illustrating a state of pushing the slider with the diesel filling nozzle.

Modifying the above-explained examples (i.e.; example 1 corresponds to FIGS. 1 to 6 and 8 to 11, example 2 corresponds to FIG. 7), a fuel filler port closing apparatus of another example (Example 3) is configured. That is, the fuel filler port closing apparatus having the cover 5 (cover main body 51) opened only by the diesel filling nozzle 72. This is realized by the slider 53 that is pushed only by the diesel filling nozzle 72. The figures related to another example are the following. FIG. 12 is a plan view of a cover of another example. FIG. 13 is a plan view corresponding to FIG. 12 illustrating a state of attempting to push the slider with the gasoline filling nozzle. FIG. 14 is a plan view corresponding to FIG. 12 illustrating a state of pushing the slider with the diesel filling nozzle.

As illustrated in FIG. 12, the distance (D-out) between the two outer projections 521, 521 arranged on the holding member 52 is set to a width that passes the gasoline filling nozzle 72 and the diesel filling nozzle 72 (D-out>D-diesel>D-gas). The distance (D-in) between the two inner projections 533, 533 arranged on the slider 53 is set to a width that engages the diesel filling nozzle 72 passed between the outer projections 521 and that passes the gasoline filling nozzle 71 (D-diesel>D-in>D-gas). The configuration of other components such as the cover main body 51 and the attachment plate 56 are the same as the example described above. This means that cover 5 of the above-described examples (i.e.; example 1 corresponds to FIGS. 1 to 6 and 8 to 11, example 2 corresponds to FIG. 7) can be easily configured by replacing the holding member 52 and the slider 53 of this example (i.e., example 3 corresponds to FIGS. 12 to 14).

According to the fuel filler port closing apparatus of another example (FIGS. 12 to 14), the gasoline filling nozzle 71 passes not only between the outer projections 521, 521 but also between the inner projections 533, 533. Therefore the gasoline filling nozzle cannot push the slider 53, as illustrated in FIG. 13, due to the distance (D-out) between the outer projections 521, 521 and the distance (D-in) between the inner projections 533, 533 set as above. As illustrated in FIG. 14, the diesel filling nozzle 72 passes between the two outer projections 521, 521 but engages to the inner projections 533, 533, and thus can push the slider 53. This means that only the diesel filling nozzle 72 can open the cover 5 of another example. In other words, the cover 5 of another example provides a fuel filler port closing apparatus for diesel fuel capable of filling only the diesel fuel.

What is claimed is:

1. A fuel filler port closing apparatus in which a flapper, which closes an opening of a nozzle guide by being pushed and biased upwardly, is pushed and opened with a fuel filling nozzle inserted through an opening of a filler neck to the opening of the nozzle guide; wherein
   the fuel filler port closing apparatus is provided with a cover upwardly rotatable with respect to the opening of the filler neck;
   the cover is configured by a rotation shaft, a cover main body, which is biased upwardly and attached to the rotation shaft so as to be upwardly and downwardly rotatable with respect to the opening of the filler neck, and a slider movably attached to an upper surface of the cover main body and biased towards a peripheral edge of the cover main body; and
   the slider is arranged with a latch that engages to a latch receiver arranged on the filler neck side,
   the cover keeps a closed state by an engagement between the latch and the latch receiver, and cancels the closed state and opens upwardly by a disengagement of the latch and the latch receiver, the disengagement is triggered by the biased slider being pushed by the fuel filling nozzle, wherein
   the cover main body has a pair of outer projections facing each other at a width that does not pass a diesel filling nozzle but passes a gasoline filling nozzle arranged in front of a starting point of the biased slider; and the slider is provided with an inner projection that engages the gasoline filling nozzle passed between the outer projections.

2. The fuel filler port closing apparatus according to claim 1, wherein the slider is movable in a direction orthogonal to the rotation shaft.

3. The fuel filler port closing apparatus according to claim 1, wherein the slider is arranged with a pair of inner projections facing each other at a width that does not pass the gasoline filling nozzle passed between the outer projections but passes a fuel filling nozzle narrower than the gasoline filling nozzle.

4. A fuel filler port closing apparatus, in which a flapper, which closes an opening of a nozzle guide by being pushed and biased upwardly, is pushed and opened with a fuel filling nozzle inserted through an opening of a filler neck to the opening of the nozzle guide; wherein the fuel filler port closing apparatus is provided with a cover upwardly rotatable with respect to the opening of the filler neck;

the cover is configured by a rotation shaft, a cover main body, which is biased upwardly and attached to the rotation shaft so as to be upwardly and downwardly rotatable with respect to the opening of the filler neck, and a slider movably attached to an upper surface of the cover main body and biased towards a peripheral edge of the cover main body; and the slider is arranged with a latch that engages to a latch receiver arranged on the filler neck side, the cover keeps a closed state by an engagement between the latch and the latch receiver, and cancels the closed state and opens upwardly by a disengagement of the latch and the latch receiver, the disengagement is triggered by the biased slider being pushed by the fuel filling nozzle; wherein the cover main body has a pair of outer projections facing each other at a width that passes a diesel filling nozzle but does not pass a fuel filling nozzle thicker than the diesel filling nozzle arranged in front of a starting point of the biased slider; and the slider is arranged with a pair of inner projections, which engages the diesel filling nozzle passed between the outer projections and which faces each other at a width that passes the gasoline filling nozzle passed between the same outer projections.

* * * * *